(No Model.)
J. N. BELLINGER.
PLOW FENDER.
No. 458,214. Patented Aug. 25, 1891.
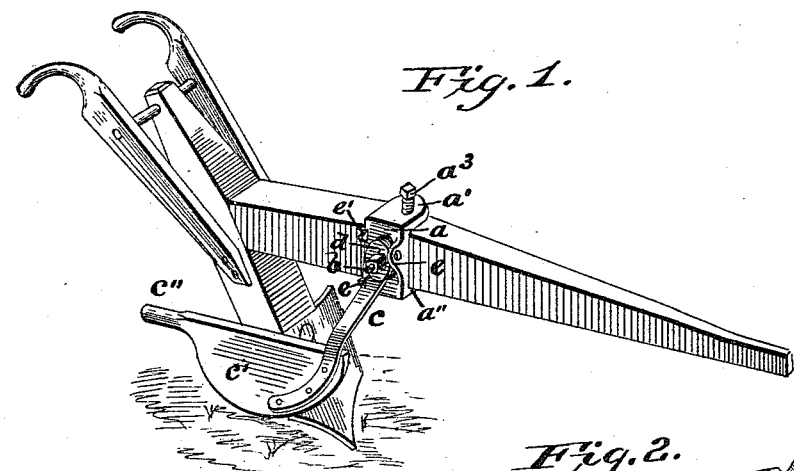
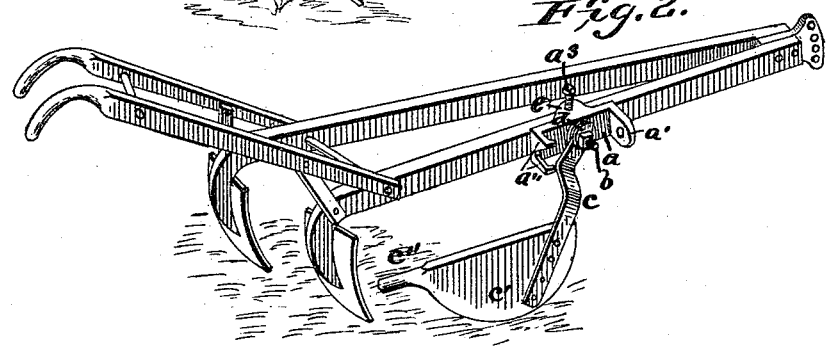
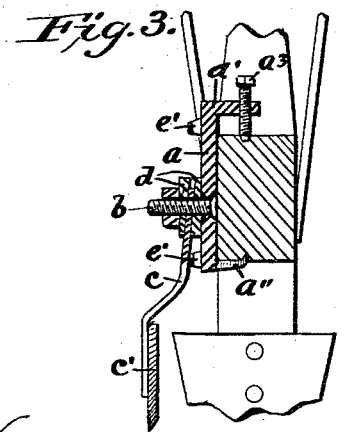
Witnesses
F. C. Gibson
W. R. Davis
Inventor
John N. Bellinger
By his Attorneys
Alexander & Davis

UNITED STATES PATENT OFFICE.

JOHN N. BELLINGER, OF ADA, ARKANSAS.

PLOW-FENDER.

SPECIFICATION forming part of Letters Patent No. 458,214, dated August 25, 1891.

Application filed March 26, 1891. Serial No. 386,573. (No model.)

*To all whom it may concern:*

Be it known that I, JOHN N. BELLINGER, a citizen of the United States, residing at Ada, in the county of Conway and State of Arkansas, have invented certain new and useful Improvements in Plow-Fenders, of which the following is a specification, reference being had therein to the accompanying drawings.

In the accompanying drawings, Figure 1 represents a perspective view of my improved fender attached to the wooden beam of an ordinary single-shovel cultivating-plow. Fig. 2 represents it as attached to the iron beam of a double-shovel plow, and Fig. 3 a vertical transverse sectional view of the devices for attaching the fender to the plow.

The object of the invention, briefly speaking, is to provide a simple and inexpensive detachable fender for cultivating-plows that will be so constructed as to be capable of being readily applied to the different classes of plow-beams now in use and adjusted to suit different-sized shovels, as will more fully hereinafter appear.

Referring to the drawings by letter, $a$ designates a cast plate approximately oblong in shape and having formed on its upper end a horizontal arm or lip $a'$ and on its lower end a pair of prongs or lips $a''$, the former being provided with a threaded aperture for the passage of a vertical set-screw $a^3$. This plate is attached adjustably and removably to wooden plow-beams in the manner shown in Fig. 1—that is to say, its lower prongs are placed under the beam and the arm carrying the set-bolt placed over the same, the set-bolt being then screwed down upon the beam, thereby firmly clamping the same. Passing through the plate at about its center and projecting outwardly therefrom is a removable horizontal bolt $b$, the head of this bolt being countersunk in the face of the plate next to the beam and its outer end being provided with a clamping-nut. A pair of washers $d$ is placed on this bolt between the nut and the plate, and between these washers is clamped the forward end of the arm $c$ of the fender $c'$. The arm of the fender extends rearwardly and downwardly, and is bent outwardly from the plow-beam a sufficient distance to bring the fender alongside of the shovel, where it will be most effective in shielding the young plants being cultivated from the soil thrown up by the shovel. The fender is formed in any suitable shape, but is preferably semicircular, its lower curved edge being brought to a cutting-edge, in order that it may pass through the soil readily. The rear upper end of the fender is provided with a rearwardly-extending handle $c''$, whereby the plowman may readily steady it while plowing.

For the purpose of adjusting the fender inwardly and outwardly with respect to the plow-shovel, so as to accommodate different kinds and sizes of shovels, the clamping-washers $d$ are beveled or inclined on their adjacent faces, thereby enabling the fender to be readily set inwardly or outwardly by simply adjusting the washers rotatively upon the bolt, as is evident.

To apply the fender to an iron-beam plow, as shown in Fig. 2, I form on one of the longitudinal edges of the plate a lip $e$, provided with a screw-threaded passage for the set-screw, and on its other longitudinal edge a pair of lips $e'$ $e'$, these lips projecting from the face of the plate opposite to the other lips.

In arranging the device for attachment to an iron beam the set-screw is removed from the lips at the end of the plate and screwed into the hole in the lip $e$, and the fender and washers are removed from the horizontal bolt and the same removed and passed through the plate from the opposite side. The washers and fender and nut are then replaced on the bolt and the plate attached to the beam lengthwise of the same by means of the lips on the longitudinal edges of the plate and the set-screw, as shown in Fig. 2. It will thus be seen that my improved fender attachment may be readily adapted and adjusted to the various cultivating-plows now in common use, and in this ready adaptability to different plows lies its chief advantage.

Having thus fully described my invention, what I claim, and desire to secure by Letters Patent, is—

1. The combination of a plow-beam, a reversible plate clamped to the side thereof, a horizontal bolt projecting therefrom and provided with a clamping-nut, a pair of rotatively-adjustable washers on the said bolt, the adjacent faces of these washers being beveled or inclined, and a fender-arm carrying a fender and clamped between the inclined faces of the said washers, whereby the fender may be adjusted with respect to the plow, substantially as described.

2. The combination, with a plow-beam, of a plate provided upon its opposite faces with oppositely-projecting pairs of lips, a removable set-screw adapted to work in a threaded hole formed in one of each pair of said lips, and a removable and reversible bolt supported by said plate and carrying a fender, substantially as described.

In testimony whereof I affix my signature in presence of two witnesses.

JOHN N. BELLINGER.

Witnesses:
J. M. MORRIS,
D. M. ALLEN.